US006045955A

United States Patent [19]

[11] Patent Number: 6,045,955

[45] Date of Patent: *Apr. 4, 2000

Vincent

[54] PRINT METHOD AND APPARATUS FOR RE-WRITABLE MEDIUM

[75] Inventor: Kent D. Vincent, Cupertino, Calif.

[73] Assignee: Hewlett-Packard Company, Palo Alto, Calif.

[ * ] Notice: This patent is subject to a terminal disclaimer.

[21] Appl. No.: 09/172,929

[22] Filed: Oct. 14, 1998

Related U.S. Application Data

[63] Continuation of application No. 08/864,604, May 28, 1997, Pat. No. 5,866,284.

[51] Int. Cl.$^{7}$ .......................... G03G 17/00; G02B 26/00

[52] U.S. Cl. .............................. 430/45; 430/37; 359/296; 345/107

[58] Field of Search ........................ 430/45, 37; 359/296; 345/107

[56] References Cited

U.S. PATENT DOCUMENTS 5,866,284 2/1999 Vincent .................................... 430/37

*Primary Examiner*—John Goodrow

[57] ABSTRACT

A low cost, high speed, high resolution laser printer method and apparatus for re-writable media is presented. Three aspects are presented: 1) a bi-stable, microencapsulated colorant and surface coating therefore for producing an electric field writable and erasable medium—such as paper or a paper-like display, 2) an electrophotographic printer that is capable of conventional toner-based printing and re-writable "paper" printing and 3) a greatly simplified electrophotographic printer that is dedicated to printing re-writable media. The printer embodiments are based on conventional low cost laser printer designs, and have significant advantages in product cost, printing resolution and speed over the electrode array printer. A laser scanner is used to writably erase the uniform, high voltage charge deposited on the surface of a photoconductor drum or belt. When the re-writable paper is brought in contact with the charge written photoconductor through a biased back electrode roller, fields generated between the photoconductor and back electrode cause orientation of the colorant within the microcapsules to develop the desired print image.

34 Claims, 10 Drawing Sheets

PRINT METHOD AND APPARATUS FOR RE-WRITABLE MEDIUM

CROSS REFERENCE TO RELATED APPLICATION

This is a continuation of application Ser. No. 08/864,604 filed on May 28, 1997, now U.S. Pat. No. 5,866,284.

BACKGROUND OF THE INVENTION

1. Field of the Invention

The present invention relates to printing and, more particularly, to printing on re-writable media.

2. Description of the Related Art

The majority of printed paper is read once or twice then discarded. Not only is this wasteful of a valuable natural resource (trees), but paper constitutes a significant volume of waste disposal and recycling. There is much interest in providing a paperless office through electronic displays and the Internet. Users, however, find displays to be an inferior alternative to the printed page over a wide range of parameters, not the least of which is eye strain. Thus, there is a growing need and market for a paper or paper-like sheet that can be electronically printed, erased and re-used.

Electrostatically polarized, dichroic particles for displays are well known. Published work by Jacques Pankove of RCA dates back to at least March 1962 (RCA Technical Notes No. 535). Dichroic spheres having black and white hemispheres are reported separately for magnetic polarization by Lawrence Lee, and for electrostatic polarization by Nick Sheridon of Xerox, as early as 1977 (S.I.D. Vol. 18/3 and 4, p. 233 and 239, respectively).

Xerox has been most active in developing dichroic spheres for displays and printer applications. Xerox U.S. Pat. No. 4,126,854, issued Nov. 21, 1978 to Nick Sheridon, describes a dichroic sphere having colored hemispheres of differing Zeta potentials that allow the spheres to rotate in a dielectric fluid under this influence of an addressable electric field. In this, and subsequent U.S. Pat. No. 4,143,103, issued Mar. 6, 1979, Sheridon describes a display system wherein the dichroic spheres are encapsulated in a transparent polymeric material. The material is soaked in a dielectric fluid plasticizer to swell the polymer such that cavities form around each dichroic sphere to allow sphere rotation. The same dichroic fluid establishes the Zeta potential electrostatic polarization of the dichroic sphere. In U.S. Pat. No. 5,389,945, issued Feb. 14, 1995, Sheridon describes a printer that images the polymeric sheet containing the dichroic spheres with a linear electrode array, one electrode for each pixel, and an opposing ground electrode plane.

The dichroic sphere has remained a laboratory curiosity over this period in part because of its high manufacturing cost. The most common reported manufacturing technique involves vapor deposition of black hemispheres on the exposed surface of a monolayer of white microspheres, normally containing titanium dioxide colorants. Methods of producing the microspheres and hemisphere coating are variously described by Lee and Sheridon in the above identified S.I.D. Proceedings. More recently, Xerox has developed techniques for jetting molten drops of black and white polymers together to form solid dichroic spheres when cooled. These methods include circumferentially spinning jets, U.S. Pat. No. 5,344,594, issued Sep. 6, 1994. Unfortunately, the colliding drops produce swirled colorant about the resultant sphere and it is difficult to prevent agglomeration of molten spheres when the concentration of droplets emitted approaches reasonable volumes. None of these techniques lend themselves to bulk, large scale production because they lack a continuous, volume process.

Lee has described microencapsulated dichroic spheres within an outer spherical shell to provide free rotation of the colorants within a solid structure. A thin oil layer separates the dichroic sphere and outer shell. This allows the microspheres to be bound in solid film layers and overcomes the need to swell the medium binder, as proposed by Sheridon. This technique, however, is generally described for magnetic dichroic spheres in the above-referenced S.I.D. Proceedings authored by Lee.

Sheridon describes an electrode array printer for printing re-writable paper in U.S. Pat. No. 5,389,945, issued Feb. 14, 1995. Such a printer relies on an array of independently addressable electrodes, each capable of providing a localized field to the re-writable media to rotate the dichroic spheres within a given pixel area. Although electrode arrays provide the advantage of a potentially compact printer, they are impractical from both a cost and print speed standpoint. Each electrode must have its own high voltage driver to produce voltage swings of 500–600 volts across the relatively low dielectric re-writable paper thickness to rotate the dichroic spheres. Such drivers and their interconnects across an array of electrodes makes electrode arrays costly. The print speed achievable through electrode arrays is also significantly limited because of the short nip time the paper experiences within the writing field. The color rotation speed of dichroic spheres under practical field intensities is in the range of 20 msec or more. At this rate, a 300 dpi resolution printer employing an electrode array would be limited to under one page per minute print speed.

Thus, it can be seen that electrode array printing techniques impose resolution, cost and speed limits upon re-writable media printing devices, and hinder the use of these devices in many applications.

Therefore, there is an unresolved need for a printing technique that can quickly and inexpensively print to re-writable media at high resolution.

SUMMARY OF THE INVENTION

A low cost, high speed, high resolution laser printer method and apparatus for re-writable media is presented. Three aspects are presented: 1) a bi-stable, microencapsulated colorant and surface coating therefore for producing an electric field writable and erasable medium—such as paper or a paper-like display, 2) an electrophotographic printer that is capable of conventional toner-based printing and re-writable "paper" "printing" and 3) a greatly simplified electrophotographic printer that is dedicated to printing re-writable media.

The printer embodiments are based on conventional low cost laser printer designs, and have significant advantages in product cost, printing resolution and speed over the electrode array printer. A laser scanner is used to writably erase the uniform, high voltage charge deposited on the surface of a photoconductor drum or belt. The voltage swing between charged and discharged areas of the photo conductor is conventionally on the order of the aforementioned 500–600 volts requirement. When the re-writable paper is brought in contact with the charge written photoconductor through a biased back electrode roller, fields generated between the photoconductor and back electrode cause orientation of the colorant within microcapsules to develop the desired print image.

Because the contact nip between the paper and photoconductor is conventionally a minimum 0.08 inch, a resolution independent minimum print speed of 20 pages per minute should be achievable for microcapsules capable of the aforementioned 20 msec color orientation rates. An advantage of the present invention is that the nip contact area can be increased for high print speeds. Thus, the relative low cost, high resolution capability of laser scanners and photoconductors can be provided to re-writable media.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1A–11. Those skilled in the art will readily appreciate that the detailed description given herein with respect to these figures is for explanatory purposes, however, because the invention extends beyond these limited embodiments.

The rewritable media of the present invention comprises a substrate, such as paper or film, having thereon or therein a bistable, bichromal colorant that is color responsive to an electric field. An electric field of a first polarity applied across the colorant will display a first color. An electric field of the opposing polarity applied across the colorant will display a second color. The induced color remains stable over a prolonged period of time, if not indefinitely, in the absence of an applied electric field. Bistable, bichromal colorants suited for the present invention are well known in the art and have generally been adopted for use in passive displays. Typically, the colorant comprises a color particle or particles suspended in a dielectric liquid held captive in a microcavity, such as a microcapsule. In the instance of the present invention, the colorants are preferably uniformly dispersed within the media or in a surface coating thereon.

"Twisting ball" bichromal colorants have been described by Sheridan in U.S. Pat. No. 5,344,594. The twisting ball colorant comprises a micron-size sphere having opposing black and white hemispheres with opposing Zeta potentials in the dielectric fluid. Each ball rotates within its cavity in response to an externally applied electric field to expose the black or white hemisphere, depending on the polarity of the field.

Figure 1A:
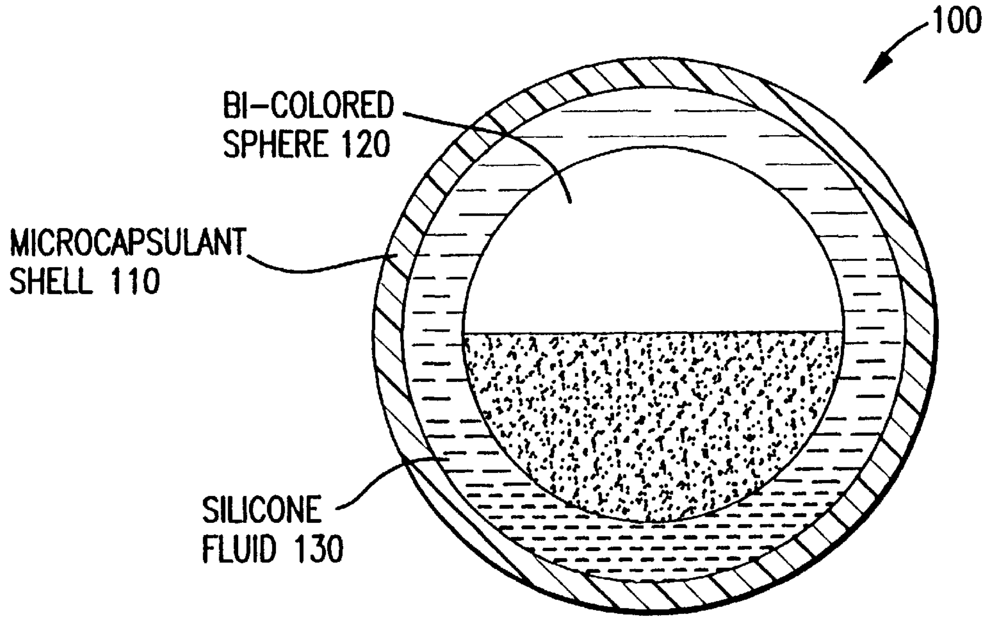
FIG. 1A is a diagram illustrating a microcapsule suitable for use in a re-writable medium for a printer according to the present invention.

FIG. 1A is a diagram illustrating a microcapsule 100 suitable for use in a re-writable medium for a printer according to one embodiment of the present invention. For this embodiment, the microcapsule 100 comprises a solid bi-colored sphere 120 housed in a spherical microencapsulant shell 110. The sphere 120 is coated with a lubricating fluid 130. The sphere 120 is white on one hemisphere and black on the opposing hemisphere. The black is vapor deposited on a solid white sphere usually composed of a pigmented glass or polymer or ceramic. The vapor deposit also contains charge species to give the sphere 120 an electric dipole for field alignment.

Comiskey et al. describe a microencapsulated electrophoretic ink colorant in Nature, "An electrophoretic ink for all-printed reflective electronic displays", at pages 253–255, Vol. 394, July, 1998 comprising a dispersion of white pigment particles in a dielectric fluid containing blue dye. A Zeta potential is established at the pigment-liquid interface. The pigment moves within the microcapsule in response to the applied field so that either the white pigment or blue dye is exposed to the observer. The density of the dielectric fluid is selected to approximate the density of the pigment to limit colorant settling in the absence of an electric field.

Comiskey et al. disclose in the same publication an electrophoretic ink colorant comprising a suspension of white and black pigment particles, having opposing Zeta potentials. FIG. 1C is a diagram illustrating a microcapsule 100 suitable for use in a re-writable medium for a printer according to an alternate embodiment of the present invention. For this embodiment, the microcapsule 100' comprises white microparticles 120W and black microparticles 120B housed in capsule wall shell 110'. The white and black pigment particles are drawn in opposing directions within the confining microcapsule when an electric field is applied. The colorant appears either white or black to the observer depending on the polarity of the field applied across the colorant. Preferably, the colorant is dispersed in a polymer coating uniformly applied to a surface of the rewritable substrate. The polymer is preferably flexible, yet hard to allow radiusing of the substrate without crushing the colorant microcavities. Most preferably, at least one of the bichromal colors is white to give the rewritable media a white paper appearance when all of the colorants are so oriented. Unlike the display of Comiskey, the media of the present invention does not require electrodes because the field of the printer is produced external to the media.

Figure 1B:
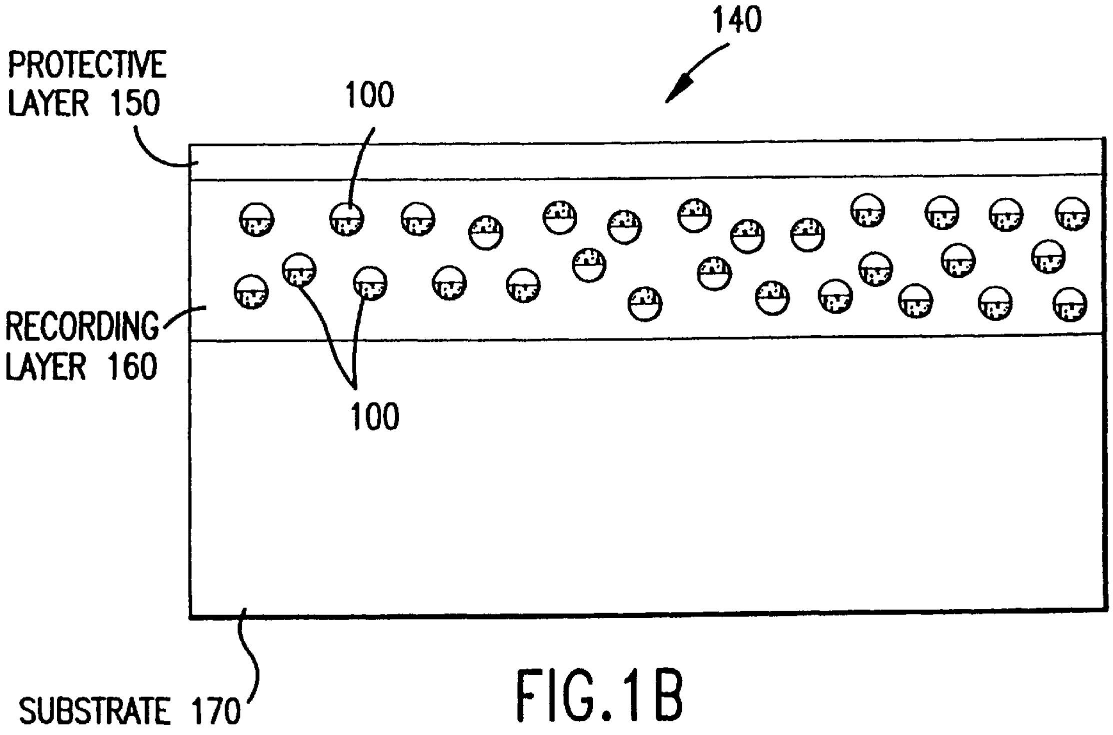
FIG. 1B is a diagram illustrating a re-writable medium for a printer according to the present invention.
Figure 1C:
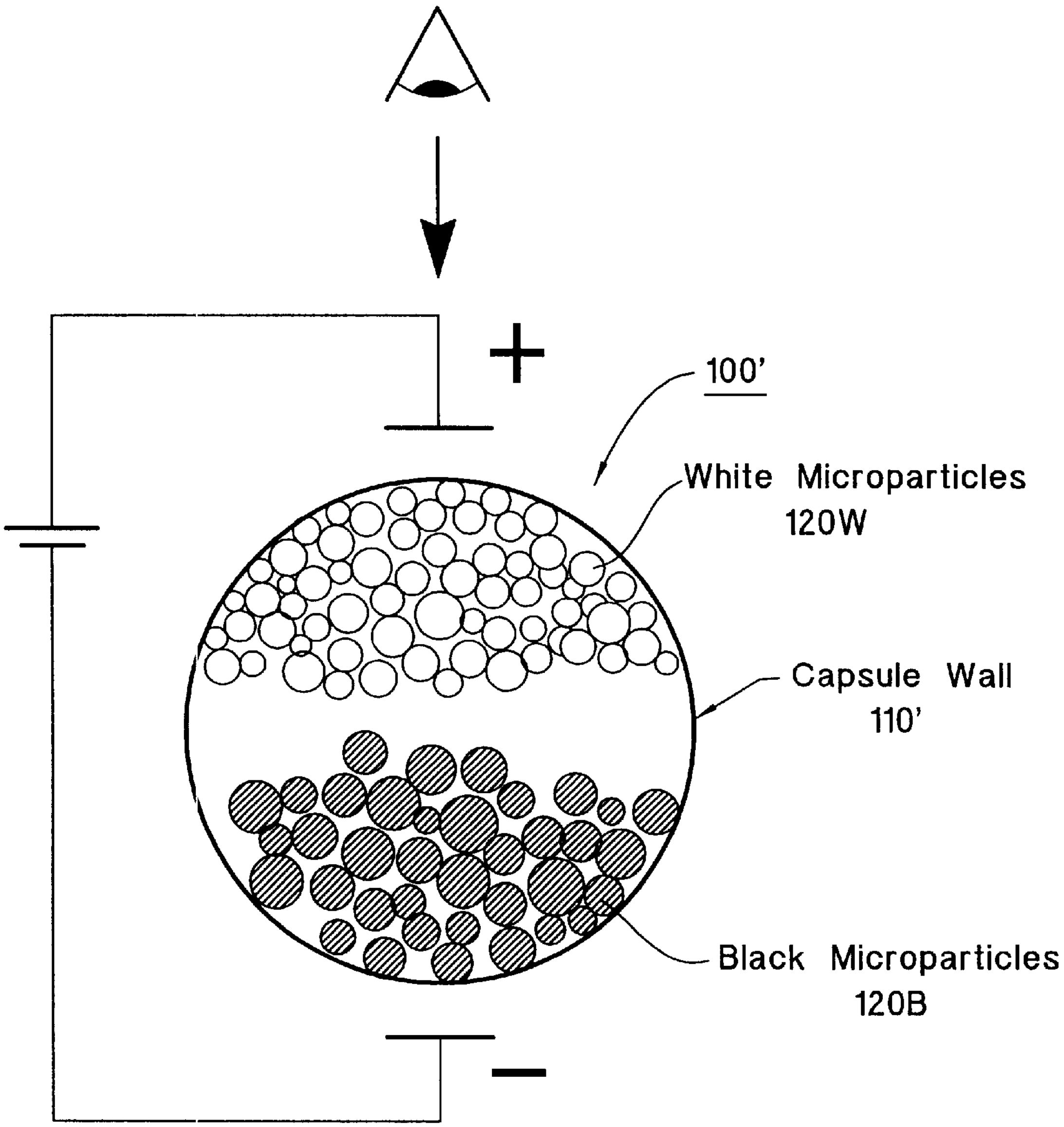
FIG. 1C is a diagram illustrating a microcapsule suitable for use in a re-writable medium for a printer according to an alternate embodiment of the present invention.

FIG. 1B is a diagram illustrating a re-writable medium 140 for a printer according to the present invention. Because the microcapsule colorant operates within the microcapsule 100, the microcapsule 100 can be supported in a fixed, polymer coating layer. Writing and erasing only requires a field (electric field). There is no thermal component required. This makes modifications of a standard laser printer for normal toner and re-writable paper possible.

The re-writable medium 140 comprises at least one layer of an electric field polarizable orientable colorant on a sheet substrate 170. This coating layer (i.e., recording layer 160) is composed of a polymer binder and a bi-stable, dual color microcapsule 100. The bi-stable, dual color microcapsule 100 is shown in FIG. 1B, and has also been described in connection with FIGS. 1A and 1C. For example, a charge on the bi-colored sphere, induced through the black hemisphere coating allows electric field orientation of the bi-colored sphere in the microcapsule 100 so that either the white or the black hemisphere faces the top surface of the recording surface, and hence, faces the observer. Alternately, the white and black pigment particles within microcapsule 100' are drawn in opposing directions within the confining microcapsule when an electric field is applied. To avoid confusion, the following discussion will be made within the context of color rotation within the microcapsule 100. However, it is to be understood that the following discussion applies equally to the movement of microparticles within a microcapsule 100'. It is further to be understood that the microcapsule can be formed as a microcavity within the media itself using a component of the media to form the wall of the microcapsule.

Sufficient quantity of microcapsules 100 are introduced into the recording layer 160 so that the medium 140 appears opaque white or black when all of the microcapsules 100 are oriented in the same direction. For one embodiment, the substrate 170 of the re-writable medium 140 has the look and feel of paper, but has far greater durability than common to most cellulose fiber papers. Such media are known in the art, and commonly consist of polymeric impregnated papers or polymeric fibers woven or assembled into films that have a paper appearance. Examples of such include Tyvek® from E. I. du Pont de Nemours and Company, Wilmington, Del. Dupont and a series of Master-Flex™ papers from Appleton Papers Inc., Appleton, Wis.

An optional protective layer 150 may be overcoated on the recording layer 160 to augment total medium durability. Such a layer 150 might be comprised of a polymer, such as PMMA (polymethylmethacrylate), or a blend of polymers. Under ideal conditions, the polymer binder and microcapsule shell are of matched refractive index to minimize light scattering within the recording layer 160. Such light scattering will otherwise desaturate the density of any black image produced on the re-writable medium 140, negatively impacting contrast. The gloss of the recording medium 140 may be controlled by the recording layer 160 or optional protective layer 150. Alternately, the refractive indices can be mismatched to enhance the white paper mode. That is, if the white of the sphere is insufficient, a substantial refractive index can be included to induce light scattering, and thereby enhance the whiteness. Coating techniques and gloss controlling coating additives are well known in the coating art and will not be described here. Although the medium substrate 170 has been described as paper-like, it should be understood that any flexible sheet material compatible with the paper path of the laser printer is applicable to this invention. These may be fibrous or non-fibrous.

Figure 2:
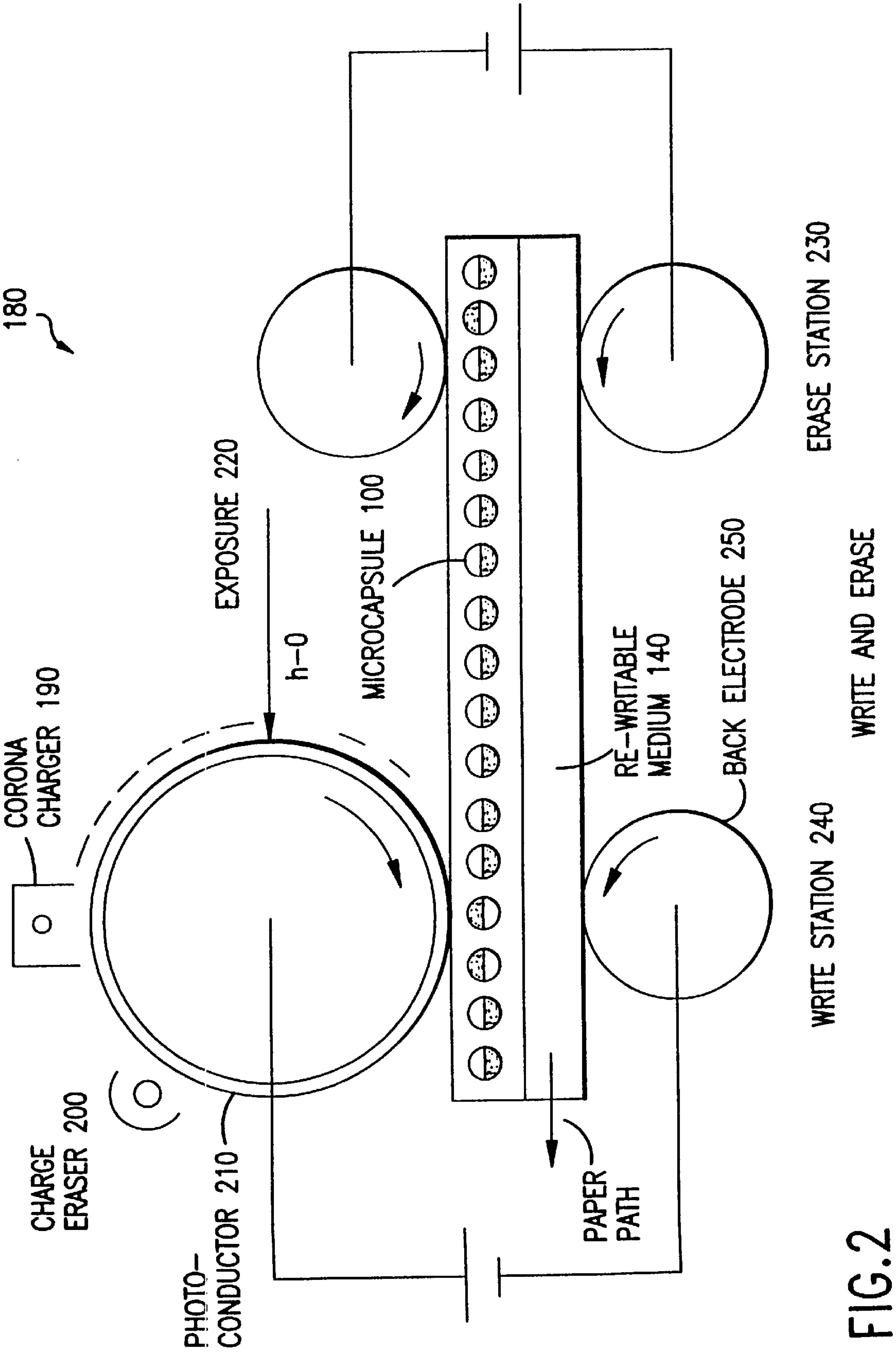
FIG. 2 is a diagram illustrating an embodiment of a re-writable medium printer according to the present invention.

FIG. 2 shows a printer 180 embodiment for the re-writable medium 140 of FIG. 1B. For one embodiment, the write station 240 is comprised of a standard laser printer photoconductor, charging and light writing apparatus. Charge produced on a photoconductor 210 drum (shown) or belt by a corona charger 190 or like device is erased preferentially by an impinging laser beam or other light exposure device 220.

A field is established through the re-writable print medium 140 when the medium 140 passes between the photoconductor 210 and a back electrode 250 roller. The field polarity and magnitude will fluctuate according to the charge characteristics of the virtual (charge) image on the photoconductor 210 causing the image to be recorded on re-writable medium 140 through orientation of microcapsules 100. After printing, any remaining charge on photoconductor 210 is erased by charge eraser 200, normally a pagewide illumination source.

Alternately, back electrode 250 roller is not biased, but is allowed to float with respect to the charge stored on photoconductor 210. In such a case, the roller simply acts as a support structure to hold medium 140 proximate to photoconductor 210 as the charge stored on photoconductor 210 causes re-writable medium 140 to record the image.

Although FIG. 2 shows a separate erase station 230, alternately, proper biasing of the back electrode 250 can eliminate the need for a separate erase station 230. For example, a nominal organic photoconductor may be charged to −600 V and discharged to −100 V when exposed to light. By applying a bias on the back electrode 250 of −350 V, the developed field across the re-writable medium 140 will be −250 V whenever the still-charged region of the photoconductor 210 contacts the medium 140. In one field direction, the microcapsule 100 will be oriented white up, and in the other field direction the microcapsule 100 will be oriented black up. Thus, regardless of the orientation of the microcapsule 100 colorants entering the nip of the photoconductor 210 and back electrode 250 (previous image), the desired new image will be developed as desired.

Thus, for one embodiment, the field voltage fluctuates from −250 to +250 V and the back electrode is set approximately half way between the photoconductor charge and discharge voltages. In general, the formula would be:

$$\text{transfer roller bias} = \frac{Vc - Vdc}{2}$$

where Vc=charged photoconductor and Vdc=discharged photoconductor (pixel area).

Erase time and write time can be made the same, and therefore optimized from a printer design viewpoint, because write E fields and erase E generated by biasing in this manner have equal magnitudes, but opposite direction.

Figure 8B:
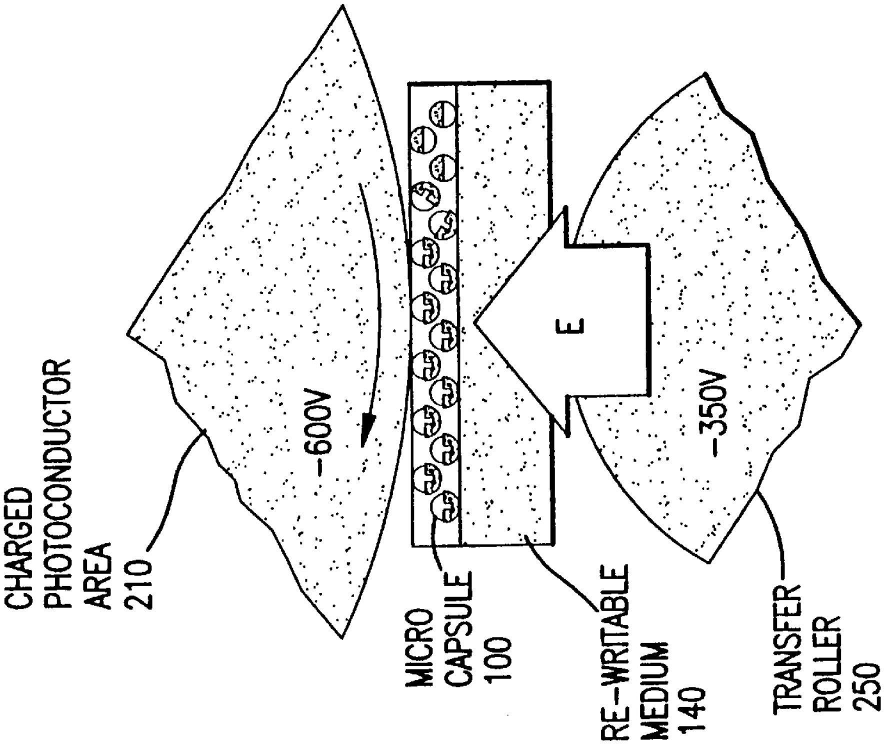
FIG. 8B illustrates the writing of a white region as practiced according to one embodiment of the present invention.
Figure 8A:
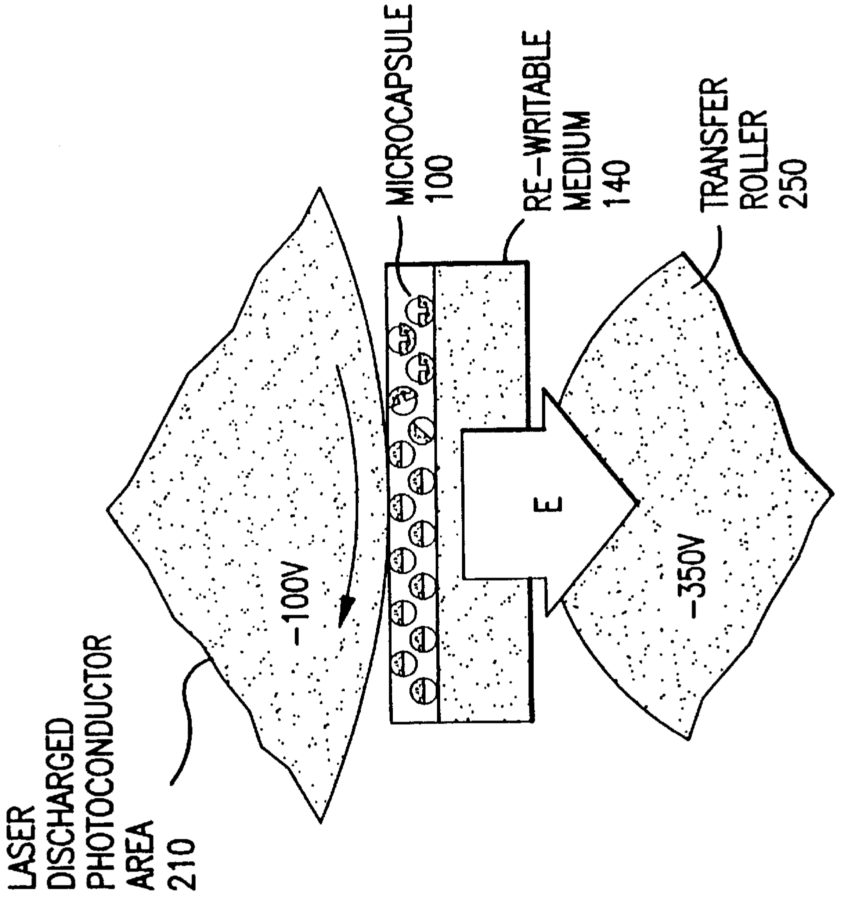
FIG. 8A illustrates the writing of a black region as practiced according to one embodiment of the present invention.

FIG. 8A illustrates the writing of a black region as practiced according to one embodiment of the present invention. In FIG. 8A a portion of photoconductor 210 has been writably erased by laser to discharge the portion. The discharge establishes a bias of −100 V on this portion of photoconductor 210 proximate to transfer roller 250. Because transfer roller 250 is biased at −350 V, the downward field E is created between photoconductor 210 and transfer roller 250. This field causes the microcapsules 100 to orient themselves with their black region facing toward photoconductor 210 as they pass between photoconductor 210 and transfer roller 250.

FIG. 8B illustrates the writing of a white region as practiced according to one embodiment of the present invention. In FIG. 8B a portion of photoconductor 210 remains charged because it has not been discharged by laser. The charge establishes a bias of −600 V on this portion of photoconductor 210 proximate to transfer roller 250. Because transfer roller 250 is biased at −350 V, the upward field E is created between photoconductor 210 and transfer roller 250. This field causes the microcapsules 100 to orient themselves with their white region facing toward photoconductor 210 as they pass between photoconductor 210 and transfer roller 250.

Figure 9:
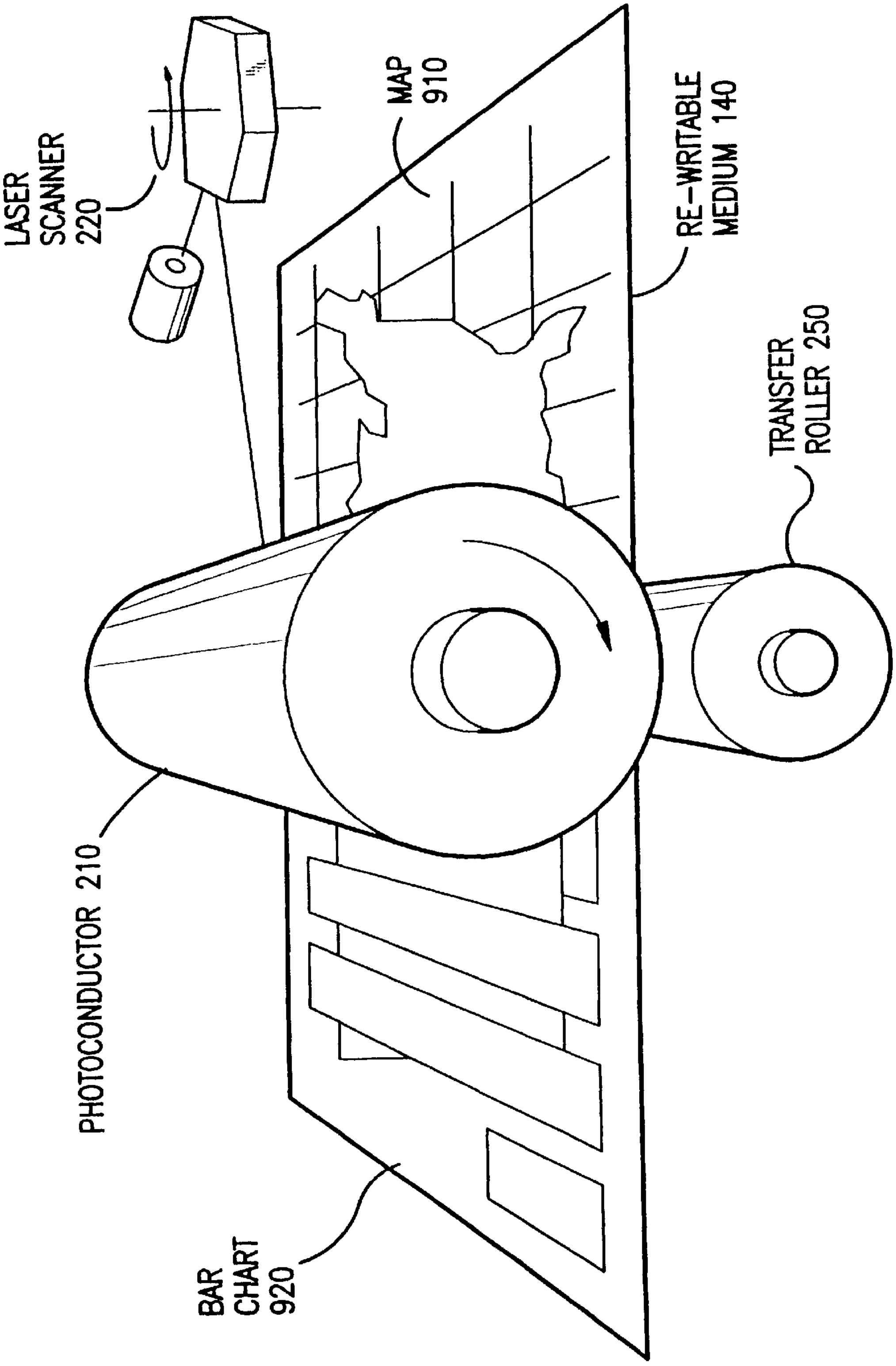
FIG. 9 illustrates simultaneous erasure and re-write as practiced according to one embodiment of the present invention.

FIG. 9 illustrates simultaneous erasure and re-write as practiced according to one embodiment of the present invention. In FIG. 9 laser scanner 220 writable erases the charge on photoconductor 210. This writable erasure creates a bias between photoconductor 210 and transfer roller 250 sufficient to cause bar chart image 920 to be recorded as re-writable medium 140 passes between photoconductor 210 and transfer roller 250. At the same time bar chart image 920 is being written, the bias between photoconductor 210 and transfer roller 250 causes map image 910 (previously recorded on re-writable medium 140) to be erased.

This scenario, wherein the photoconductor 210 serves to both write the new image while simultaneously erasing the former image is, of course, highly desirable because a separate erase station 230 will normally add parts to laser printer 180. It is anticipated, however, that operating a back electrode 250 bias of such a magnitude may reduce the developed field strength for write and erase below that required for some microcapsule 100 materials, or that the microcapsules 100 may be designed for greater field strengths to add greater image stability and resistance to erasure by exposure to fields found in the office or home. In such cases, the back electrode 250 bias must be lower, if not grounded, to optimize the field strength in the image writing mode. As such, a separate erase station 230 will be necessary.

The erase station 230 is located up stream of the photoconductor 210 as measured along the printer paper path. The erase station 230 creates a field of the correct polarity and magnitude to orient all of the microcapsules 100 in the same direction, say white facing up, so that any previous image is eliminated. It should be understood that a number of image field and erase field orientations are possible. For example, the erase station 230 could produce a solid black image so that the photoconductor 210 would write the white background image of a document. More intuitively, perhaps, the erase station 230 will produce a solid white page so that the photoconductor 210 writes the black image. Such a design decision will be determined by the charge species attached to the black or white portions of the microcapsules 100 and the polarity of the charge produced on the photoconductor 210. The electrodes composing the erase station 230 can be designed as opposing parallel plates, a set of rollers (shown) or any suitable configuration capable of producing the desired field across the re-writable medium 140. In the case of rollers, it may be desirable to coat the roller surface with a dielectric to prevent arcing between the rollers.

Laser Printer Capable of Printing with Toner and on Re-writable Media

The electric field writable and erasable medium 140 can be printed in a standard desktop or other laser printer—the same printer retaining its ability to print with conventional paper-like media using toner. Only minor additions and enhancements to such laser printer are required. It is believed that such a printer will have broad marketability as an introductory product that bridges conventional printing with a much more environmentally clean printer approach.

Figure 7:
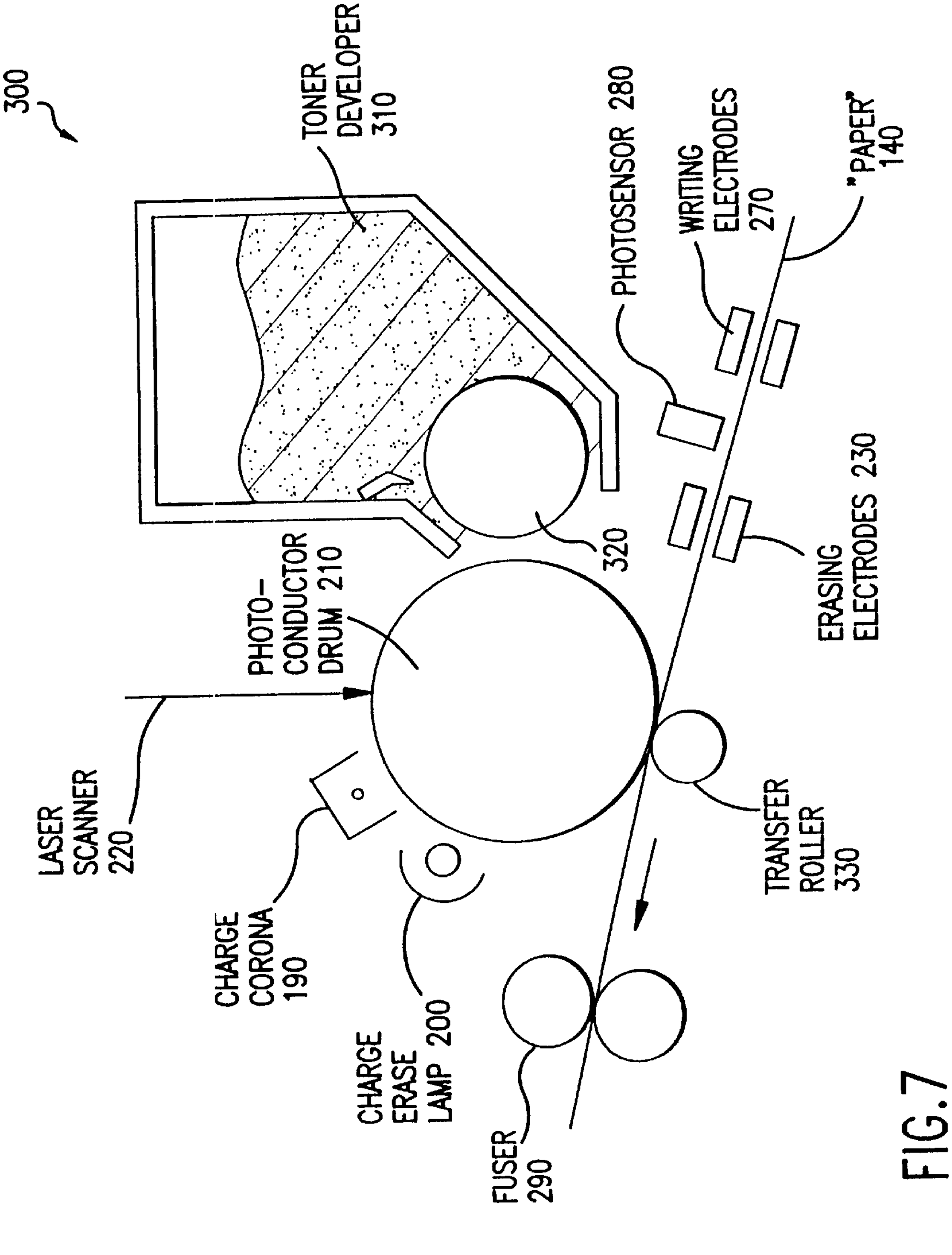
FIG. 7 is a diagram illustrating a dual-mode printer embodiment of a re-writable medium printer according to the present invention.

FIG. 7 is a diagram illustrating a dual-mode (i.e., toner and re-writable mode) printer 300 embodiment of a re-writable medium printer according to the present invention. The writing technique of this invention can produce far superior image quality on a re-writable paper 140 than with conventional electrophotographic toner development on normal paper from the same printer 300. This is because the re-writable paper 140 is imaged as a contact print with the photoconductor 210 and hence will not experience dot broadening to the extent produced by repelling toner particles and electrostatic transfer.

A necessary step in producing an acceptable image on re-writable media with a dual-mode laser printer is to disable the toner development station 310. Mechanical displacement of developer roller 320 from photoconductor 210, or blocking toner transfer through a shield (not shown) placed between the same, are workable solutions. Alternately, controlling the bias on the developer roller 320 to prevent toner development appears simpler and least intrusive to existing laser printer designs.

Figure 4:
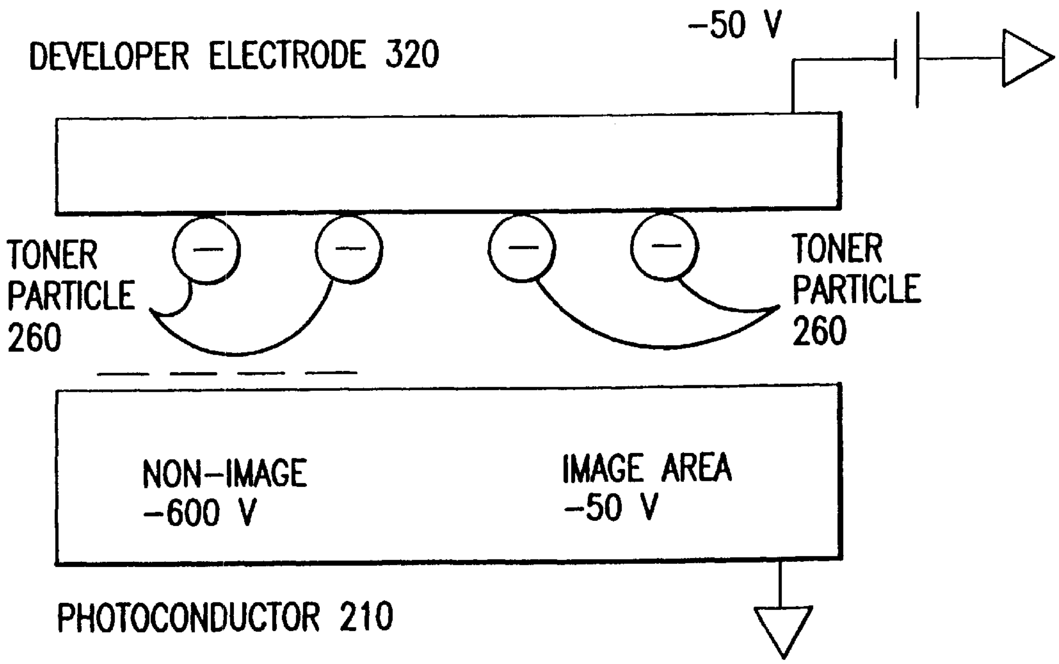
FIG. 4 is a diagram illustrating a toner disable mode embodiment of a re-writable medium printer according to the present invention.
Figure 5:
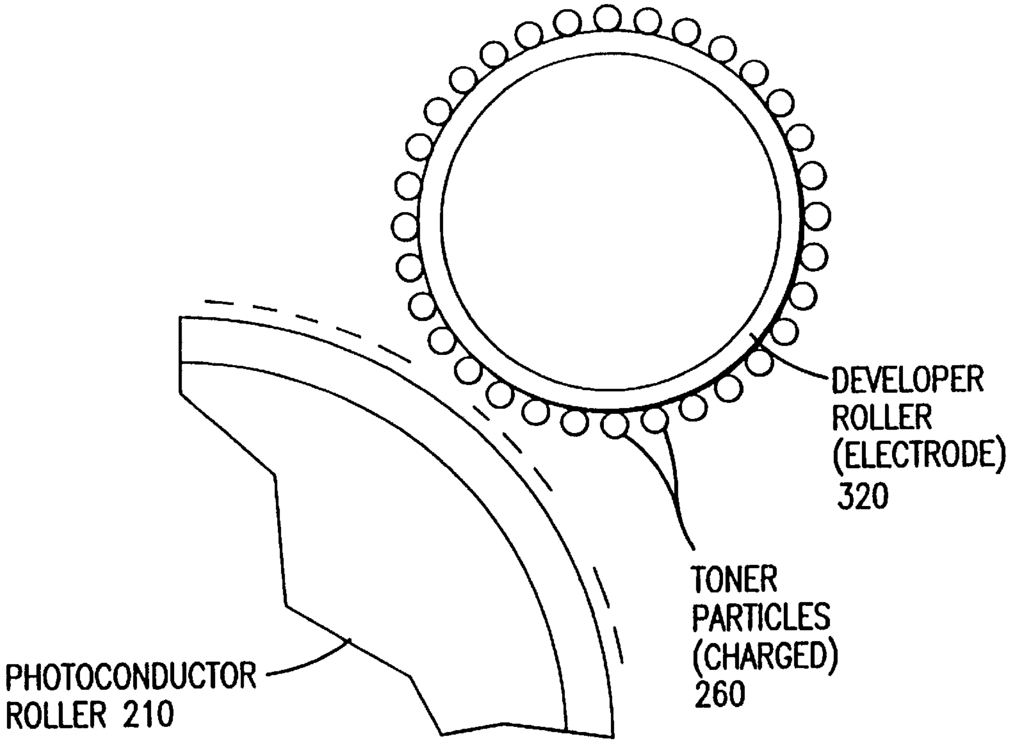
FIG. 5 is a diagram illustrating a development roller and photoconductor embodiment of a re-writable medium printer according to the present invention.

For reference, an exemplary standard configuration of developer roller 320 and photoconductor 210 is shown in FIG. 5. Although there are many development devices, the common aim is to produce a uniform layer of toner particles 260 on the development roller 320, each particle 260 having like charge polarity. In normal toner development mode, FIG. 3, a bias is placed on the developer electrode 320 (roller) to help push toner from the development roller 320 to the discharged area of the photoconductor 210 (in the case of discharged area development). This bias is held at a level between the charged area voltage of the photoconductor 210 and discharged area voltage. When the developer electrode 320 bias is dropped approximate to or below the photoconductor 210 discharge voltage (often referred to as residual voltage), FIG. 4, the developed fields between the developer roller 320 and photoconductor 210 either push toner to the developer roller 320 or have insufficient magnitude to move the toner off the development roller 320.

Thus, with simple electronic control the developer can be switched from normal toner development mode to a toner disable mode allowing tonerless printing of the re-writable paper of this invention. The developer electrode 320 voltage should be selected to also prevent development of wrong sign toner.

Figure 3:
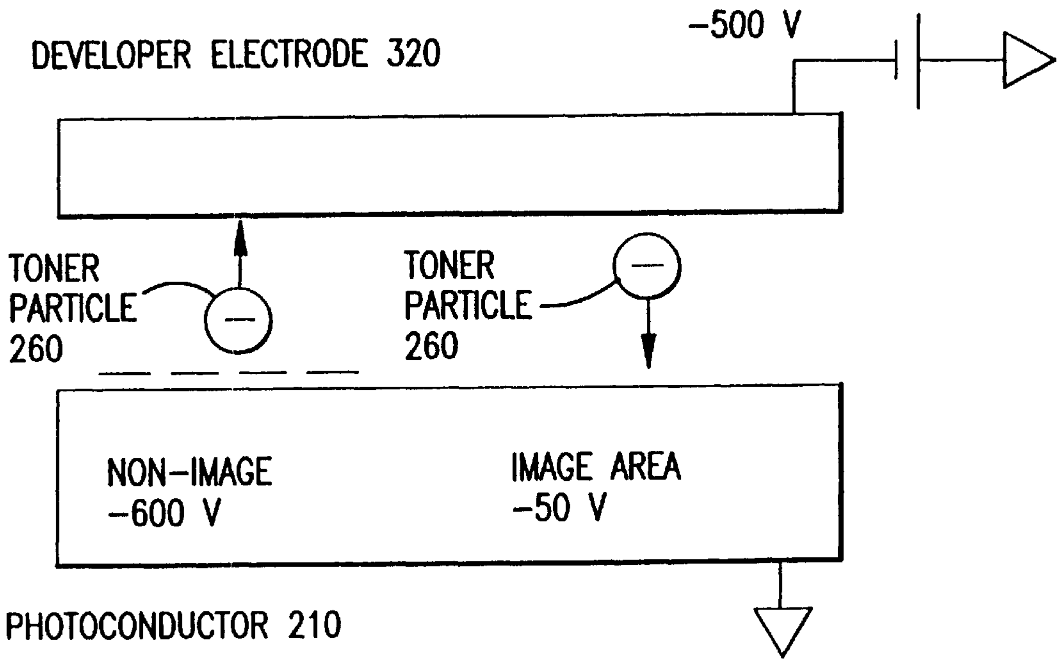
FIG. 3 is a diagram illustrating a toner development mode embodiment of a re-writable medium printer according to the present invention.

FIGS. 3 and 4 are given as a single example of how the development roller 320 bias maybe changed to disable toner development. It is noted that other development modes, such as charged area development or toner charge polarity, different from that shown here may benefit from this technique. The basic concepts still apply and will not be further discussed here.

As with the developer 310, the laser printer fuser station 290 must be disabled whenever re-writable paper is "printed". Obviously, the heat generated by the fuser 290 can easily be disabled by cutting power to the heating elements.

The re-writable paper concept described herein is readily adapted to autodetection of paper type. Although several paper sensing techniques are possible for discerning normal from re-writable paper, for example photodetection of watermarks fabricated into re-writable sheet, one technique seems most elegant. In this case, an electrode upstream from the erasure electrode is placed to bias the microcapsules located at some location on a sheet (e.g., margin) to write black. A photosensor located along the same paper path can detect whether the bias produced black (re-writable paper) or had no effect (regular paper). After detection, the test mark is erased via the erasure station or photoconductor.

In the event that re-writable paper is detected when normal (toner) printing was specified, the printer could stop the print operation and indicate the mismatch to the user. Similarly, the printer could also stop the print operation and indicate the mismatch to the user in the event that non re-write paper is detected when re-writable printing was specified. Alternately, in the case of a dual-mode printer, the printer could automatically change from re-write mode to toner mode and the print to the regular paper.

Figure 6:
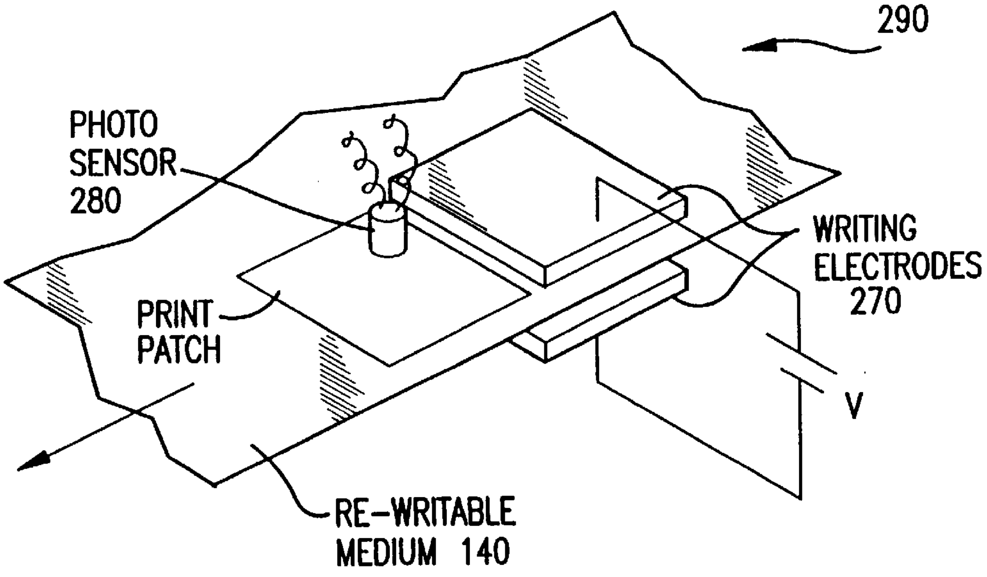
FIG. 6 is a diagram illustrating a re-writable medium detection embodiment of a re-writable medium printer according to the present invention.

FIG. 6 shows a pair of writing electrodes 270 located in the normally unprinted margin of a sheet of re-writable paper 140 along the printer paper path and upstream from a photosensor 280. The electrodes 270 are voltage biased to align all microcapsules to black up orientation. When a sheet of "paper" enters this section of the printer, the electrodes 270 are energized, so that if the paper is re-writable paper the black print patch will be imaged. If, on the other hand, the paper is not re-writable, no black image will be formed by the electrodes 270. Thus, the photosensor 280 then becomes a feedback path to determine whether the medium entering the path is conventional or re-writable "paper". Any print patch formed in this way may be erased by the erase station 230 of FIG. 2, a second set of inversely polarized electrodes (not shown) located downstream of the photosensor 280, or perhaps by the photoconductor 210 itself as described previously. Clearly, a number of different devices can be used to form the described print patch. In addition to the parallel plate electrodes 270 shown, a pair of roller electrodes, edge electrodes, or combinations of these can be used.

In an alternative embodiment, the photosensor 280 of FIG. 6 may be placed between the erase station 230 and write station 240 of the apparatus 180 of FIG. 2. In this instance, the erase station 230 is biased to produce a solid black image on re-writable paper 140, and, of course, no image (leaving white) for conventional paper. The photosensor 280, then, is positioned to detect the presence of black or white medium surface color as a determinant of the presence of re-writable or conventional "paper", respectively.

In any of these detection schemes a second photosensor can be located approximate to but on the opposite side of the print medium to detect if the re-writable sheet has been loaded into the printer upside down. In this case, a series of reversed polarity pulses would be issued by the pair of writing electrodes to produce a series of black bars and spaces. The detector facing the recording layer of the re-writable "paper" will receive the bar pattern signal.

Alternately, if an upside down sheet is detected, a sophisticated printer can mirror image the data written to the photoconductor to produce the correct right-reading image on the under side of the sheet.

FIG. 7 shows a schematic view of a simple augmentation of a conventional laser printer to include the re-writable "paper" printing process described in this entry. Fundamentally, for this embodiment, only the writing 270 and erasing 230 electrodes plus photosensor 280 described in the discussion of FIG. 6 have been added to the conventional printer. Here, also, the standard transfer roller 330, used in conventional laser printers to strip toner from the photoconductor 210 onto the paper, serves in place of the back electrode 250 shown in FIG. 2. It is noted that many laser printers use a back electrode as shown in FIG. 2 to transfer toner. Normally, however, the transfer roller is biased at about 2000 volts.

Optionally, the transfer roller 330 may be turned off. In this instance, the charge field produced by the photoconductor 210 alone may produce sufficient field to actuate the microcapsules. The fuser 290 used in this printer 300 is preferably an "instant on" type consisting of a low thermal mass heater that rises and falls rapidly in temperature when powered on and off, respectively. It is worth noting here that under the right transfer roller 330 bias setting, the need for the erasing electrodes 230 can be eliminated.

Referring also to the discussion of FIG. 2, should the transfer roller produce a charge bias on the bottom of the re-writable paper 140 of –350 V, given the same example, the writing and erasing fields will be equal in magnitude while opposite in polarity.

Figure 10:
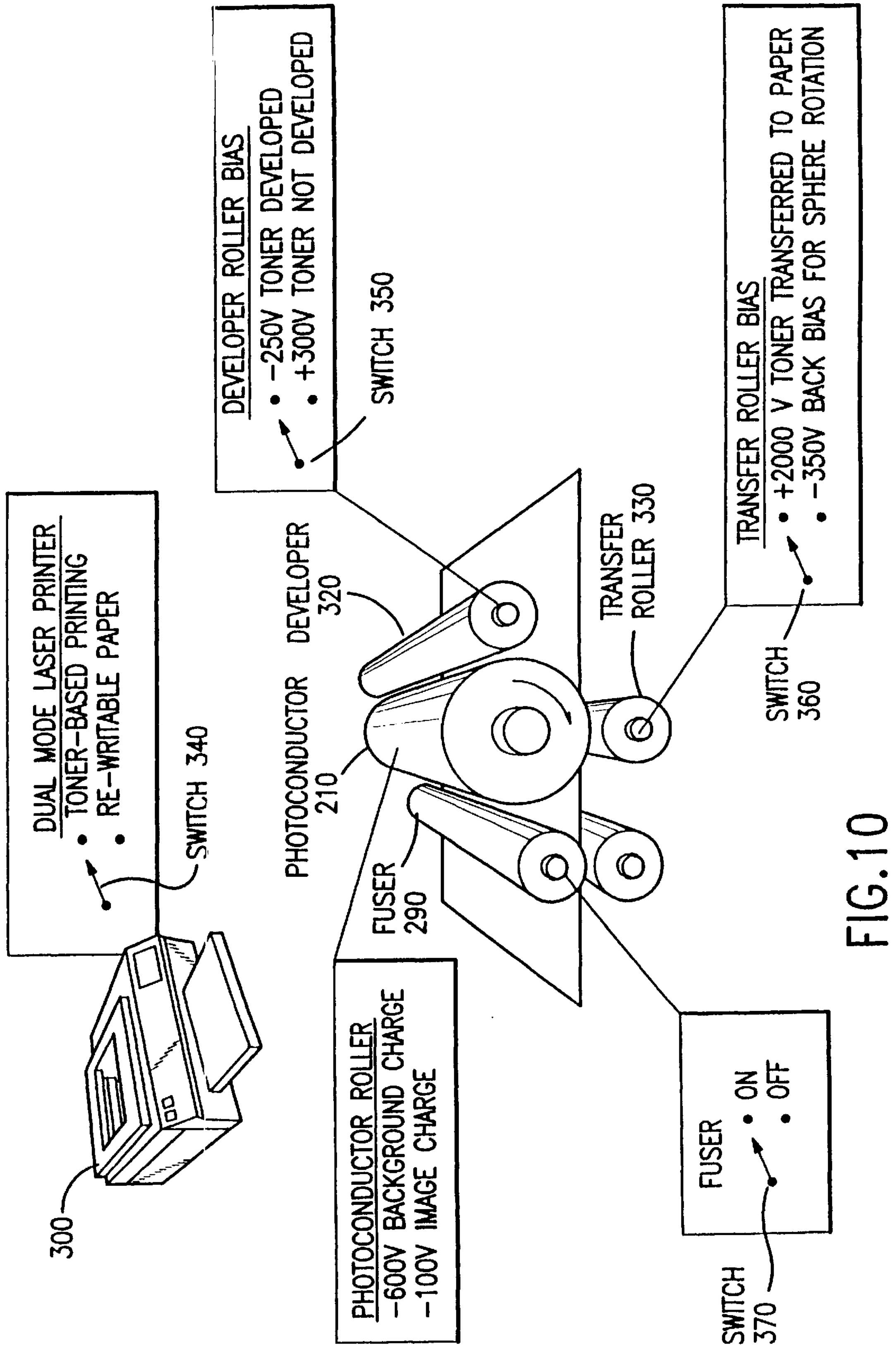
FIG. 10 is a diagram illustrating bias control settings for a dual-mode printer embodiment of a re-writable medium printer according to the present invention.

Alternately, the photosensor 280 and writing electrodes 270 can be replaced with a user activated switch to indicate whether conventional or re-writable paper is being used. FIG. 10 is a diagram illustrating bias control settings for a dual-mode printer embodiment of a re-writable medium printer according to the present invention. When a user sets switch 340 of dual-mode printer 300 from re-writable paper mode to toner-based printing, the settings for switches 350, 360 and 370 are changed. Switch 350 controls developer roller 320 bias. Setting switch 340 to toner-based print mode causes switch 350 to change the developer roller 320 bias from +300 V (toner not developed) to –250 V (toner developed). Similarly, switch 360 controls transfer roller 330 bias. Setting switch 340 to toner-based print mode causes switch 360 to change the transfer roller 330 bias from –350 V (back bias for sphere development) to +2000 V (toner transferred to paper). Finally, switch 370 controls fuser 370. Setting switch 340 to toner-based print mode causes switch 370 to change the fuser 290 power supply from "off" (no fusing of re-write medium) to "on" (fuse toner to paper).

Thus a wide variety of product options exist, including changing the transfer roller 330 voltage, for controlling the printing of conventional and re-writable paper. In the simplest embodiment, a standard laser printer 300, that is shown in FIG. 7 minus the writing 270 and erasing 230 electrodes and photosensor 280, is used with a host computer enable switch for paper setting. When conventional paper and toner printing is desired, the transfer roller 330 and development roller 320 voltages are set for toner development and transfer and the fuiser 290 temperature is set to normal fusing. When re-writable paper 140 is used, the transfer roller 330 is set to allow simultaneous old image erase and new image write by the photoconductor 210, the developer 320 bias is set to prohibit toner development, and the fuser 290 heater is deactivated. Examples of each of the voltage settings have been described earlier in this entry. In this instance, only the controller and formatter circuit logic needs to be modified, while the basic engine may be kept intact.

As stated earlier in previous entries, a stand-alone "re-writable" paper printer can be made far simpler than a conventional toner-based laser printer. Referring to FIG. 7, such a printer would eliminate the need for the toner developer 310, fuser 290 and toner cleaning station (not shown but normally acting on photoconductor 210). The same printer will not require the paper type sensor 280 and electrodes 270 shown in FIG. 7. In this instance, a re-writable paper 140 could have its image written and prior image erased as described for the printer of FIG. 2.

Two-Sided Re-writable Medium

Figure 11:
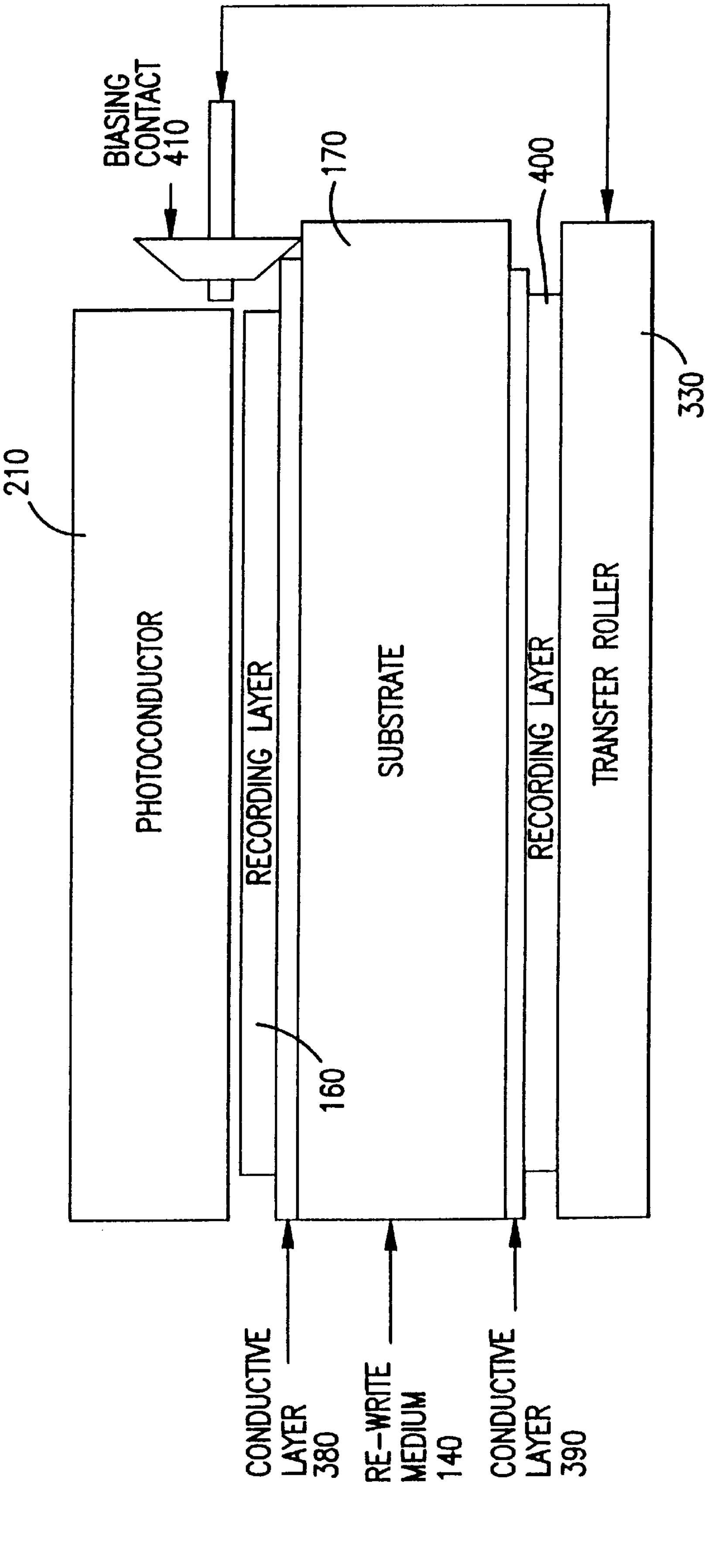
FIG. 11 illustrates a re-writable medium embodiment that has recording layers on each side of the substrate sheet.

Although the previous discussion has focused on single-sided re-writable media, it is possible to make a re-writable medium that has recording layers on each side of the substrate sheet. FIG. 11 illustrates such a two-sided re-writable medium. In FIG. 11, conductive layer 380 has been added to re-write medium 140 between recording layer 160 and substrate 170. Biasing contact 410, in this case a small wheel, physically contacts conductive layer 380 as re-write medium 140 passes by photoconductor 210. Biasing contact 410 is electrically coupled to transfer roller 330. Thus, an electric field is established between conductive layer 380 and photoconductor 210 to cause an image to be recorded by recording layer 160.

However, because conductive layer 380 is biased to the same potential as transfer roller 330, no such field will form between the transfer roller 330 and conductive layer 380. Therefore, any image stored on recording layer 400 will not be changed when writing to recording layer 160.

For one embodiment, conductive layers 380 and 390 are clear or white conductive polymer coating layers that have been deposited on substrate 170. Alternately, substrate 170 itself can be formed from a conductive material.

Although biasing contact 410 is shown to be a wheel, alternate contact mechanisms such as brushes can be employed. Furthermore, a second biasing contact can be placed on the side of substrate 170 closest to transfer roller 330. The second biasing contact would thus make contact with recording layer 400. This would permit the use of a single conductive layer placed on only one side of substrate 170. For yet another embodiment, one or more conductive layers could be formed within substrate 170 and contacted from the side (e.g., by a brush).

Advantages

In summary, the re-writable medium and printers presented herein provide many advantages.

One benefit is a significantly lower cost per printed page. The re-writable "paper" may be electrostatically printed, erased and reprinted many times, e.g., over 100 times. The anticipated cost per print, irrespective of the print density, is expected to be at least an order of magnitude less per simple text printed page than for laser and inkjet printers.

The re-writable medium printing process has no consumable. The "ink" is in the medium and is bistable, either black or paper white. There is no toner, ink or cartridge to purchase, replace or dispose of. The only disposable is the medium itself, which may be reprinted perhaps 100 times before disposal. This benefit not only provides an environmentally "green" printer solution, but eliminates the cost and "hassle" factor associated with the purchase, exchange and disposal of cartridges.

The re-writable medium can have a paper-like appearance and feel. The encapsulation design of the present invention allows incorporation of the bichromal colorant in coatings analogous to conventional pigment-based surface coatings. Such coatings can be applied to either conventional paper or paper-like substrates, giving the re-writable paper of the present invention a rather paper-like appearance and feel. This is in stark contrast to the oil swollen, polymer-based substrate described by Sheridon.

The re-writable medium has improved print quality. The colorant in the re-writable medium is fixed in location and within the medium surface coating and is written through a direct contact print with the electric field writing means. This is in sharp contrast to conventional printing methods wherein the colorant is transferred by drop ejection or electrostatic charge transfer from the writing means to the medium. With transferred colorant there is noticeable dot gain from ink wicking, splatter and satellite drops, in the case of inkjet, and electrostatic scattering and background development of wrong sign toner in the case of electrophotography. Such dot gain is not anticipated with the re-writable medium technology of the present invention.

The re-writable medium provides improved paper and image durability. The encapsulation design of the present invention protects the inner, bichromal colorant against externally applied forces, such as sheet folding or pressure from objects in contact with the sheet surface. In contrast, the Sheridon dichroic sphere floats in a flexible sheet cavity that may partially or fully collapse when subjected to the same external forces.

The re-writable medium provides geometric integrity. The microencapsulation process lends itself to the formation of geometrically precise spheres. This factor will benefit optimal contrast between the black and white states of the re-writable paper. By contrast, the Sheridon dichroic sphere is subject to swirl patterns of the black and white colorants.

The bi-modal and dedicated laser printers have a lower product cost than an electrode array device. The combined cost of a photoconductor drum and laser scanner is anticipated to be lower in product cost than a page wide electrode array and its estimated 2400 to 4800 dedicated high voltage drivers for 300 and 600 dpi printing, respectively.

The bi-modal and dedicated laser printers have a higher print speed. The larger nip area of laser printers should allow over 20 times the re-writable print speed over electrode array printers.

The bi-modal and dedicated laser printers have a higher print resolution. Standard optics and photoconductor responsivities of laser printers allow print resolutions up to 1200 dpi. It is believed that the high cost interconnects and high voltage drivers will limit electrode array printers to substantially lower practical resolutions (e.g., 300 dpi).

Furthermore, the bi-modal operation itself is an advantage. A standard laser printer engine is capable of printing both conventional (toner) and re-writable (toner-less) paper types for easy adoption of re-writable paper. The Sheridon electrode array printer is a dedicated re-writable paper printer only.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A printer for a re-writable medium, the medium having a first recording layer that includes a plurality of microcapsules, the printer comprising:

photoconductor means for storing a high voltage charge deposited thereon;

writing means for writably erasing the charge deposited on the photoconductor means; and support means for holding the re-writable medium proximate to the photoconductor means in a nip contact area such that, when the re-writable medium passes the charge written photoconductor means, fields generated from the photoconductor means cause orientation of bichromal, bistable colorant within the microcapsules to develop a print image on the re-writable medium.

2. The printer as set forth in 1, wherein the support means is biased such that the fields are generated between the photoconductor means and the support means and cause orientation of the colorant within the microcapsules.

3. The printer as set forth in 1, wherein the first recording layer of the re-writable medium is disposed on a substrate including a conductive layer and the conductive layer is biased such that the fields are generated between the photoconductor means and the conductive layer to orient the colorant within the microcapsules.

4. The printer as set forth in 3, wherein the re-writable medium includes a second recording layer disposed on the substrate and opposing the first recording layer, wherein the support means and the conductive layer are biased such that the fields are generated between the photoconductor means and the conductive layer and cause orientation of the colorant within the microcapsules in the first recording layer but not in the second recording layer.

5. The printer as set forth in 1, comprising medium type detection means for detecting presence of the re-writable medium for printing.

6. The printer as set forth in 1, comprising medium orientation detection means for detecting proper orientation of the re-writable medium for printing.

7. The printer as set forth in 6, wherein if the medium orientation detection means detects improper orientation of the re-writable medium for printing, the writing means writably erases the charge deposited on the photoconductor means according to a mirror of the print image such that, when the re-writable medium passes the charge written photoconductor means, fields generated from the photoconductor means cause orientation of the colorant within the microcapsules to develop the print image properly on the re-writable medium.

8. The printer as set forth in 1, comprising medium erasure means for erasing the re-writable medium prior to printing.

9. The printer as set forth in 8, wherein the medium erasure means and the photoconductor means are biased so as to apply approximately equal magnitude but opposite direction fields to the re-writable medium when respectively erasing and writing.

10. The printer as set forth in 1, wherein the support means is biased so as to erase prior orientation of colorant within the microcapsules of the re-writable medium while printing.

11. The printer as set forth in 10, wherein the support means and the photoconductor means are biased so as to apply approximately equal magnitude but opposite direction fields to the re-writable medium when the photoconductor is respectively charged and discharged.

12. The printer as set forth in 1, wherein the printer can enter a toner print mode, such that when in the toner print mode, the photoconductor means and the support means are biased to make charged toner particles deposited on the photoconductor means be transferred to the writable medium, in accordance with the writable erasing of the charge deposited on the photoconductor means.

13. The printer as set forth in 12, comprising fuser means for fusing toner onto the writable medium after rinting in the toner print mode.

14. The printer as set forth in 12, comprising medium type detection means for detecting presence of the re-writable medium for printing, and if re-writable medium presence is not detected, causing the printer to enter the toner print mode.

15. A printing process, the process comprising the steps of:

depositing a high voltage charge on a photoconductor;

writably erasing the charge deposited on the photoconductor; and holding a re-writable medium proximate to the photoconductor in a nip contact area, the re-writable medium having a first recording layer that includes a plurality of microcapsules such that, when the re-writable medium passes the charge written photoconductor, fields generated from the photoconductor cause orientation of bichromal, bistable colorant within the microcapsules to develop a print image on the re-writable medium.

16. The process as set forth in 15, comprising the step of biasing a support holding the re-writable medium proximate to the photoconductor such that the fields are generated between the photoconductor and the support to cause orientation of colorant within the microcapsules.

17. The process as set forth in 15, wherein the first recording layer of the re-writable medium is disposen a substrate including a conductive layer, the process comprising the step of biasing the conductive layer such that the fields are generated between the photoconductor and the conductive layer and cause orientation of the colorant within the microcapsules.

18. The process as set forth in 17, wherein the re-writable medium includes a second recording layer disposed on the substrate and opposing the first recording layer, the process comprising the step of biasing the support and the conductive layer such that the fields are generated between the photoconductor and the conductive layer and cause orientation of the colorant within the microcapsules in the first recording layer but not in the second recording layer.

19. The process as set forth in 15, comprising the step of detecting presence of the re-writable medium for printing.

20. The process as set forth in 15, comprising the step of detecting proper orientation of the re-writable medium for printing.

21. The process as set forth in 20, comprising the step of:

if improper orientation of the re-writable medium for printing is detected, then writably erasing the charge deposited on the photoconductor according to a mirror of the print image such that, when the re-writable medium passes the charge written photoconductor, fields generated from the photoconductor cause orientation of the colorant within the microcapsules to develop the print image properly on the re-writable medium.

22. The process as set forth in 15, comprising the step of erasing the re-writable medium prior to printing.

23. The process as set forth in 22, wherein a medium eraser and the photoconductor are biased so as to apply approximately equal magnitude but opposite direction fields to the re-writable medium when respectively erasing and writing.

24. The process as set forth in 15, comprising the step of biasing a support, holding the re-writable medium proximate to the photoconductor, so as to erase prior colorant orientation within the microcapsules of the re-writable medium while printing.

25. The process as set forth in 24, wherein the support and the photoconductor are biased so as to apply approximately equal magnitude but opposite direction fields to the re-writable medium when the photoconductor is respectively charged and discharged.

26. The process as set forth in 15, comprising the step of entering a toner print mode, such that when in the toner print mode, the photoconductor and a support, holding the re-writable medium proximate to the photoconductor, are biased to make charged toner particles deposited on the photoconductor be transferred to the writable medium, in accordance with the writable erasing of the charge deposited on the photoconductor.

27. The process as set forth in 26, comprising the step of fusing toner onto the writable medium after printing in the toner print mode.

28. The process as set forth in 26, comprising the step of detecting presence of the re-writable medium for printing, and if re-writable medium presence is not detected, causing the printer to enter the toner print mode.

29. An electrode-less re-writable medium, comprising:

a substrate; and a first recording layer on the substrate, the first recording layer including a first plurality of microcapsules having bichromal, bistable colorant within the microcapsules.

30. The re-writable medium as set forth in 29, comprising a protective layer, the first recording layer being disposed between the protective layer and the substrate.

31. A re-writable medium, comprising:

a substrate having a conductive layer;

a first recording layer on the substrate, the first recording layer including a first plurality of microcapsules having bichromal, bistable colorant within the microcapsules; and a second recording layer on an opposing side of the substrate from the first recording layer, the second recording layer including a second plurality of microcapsules having bichromal, bistable colorant within the microcapsules.

32. The re-writable medium as set forth in 31, comprising a protective layer, the first recording layer being disposed between the protective layer and the substrate.

33. The re-writable medium as set forth in claim 29, wherein the substrate is polymer impregnated.

34. The re-writable medium as set forth in claim 29, wherein the substrate includes polymer fibers.

* * * * *